United States Patent
Chukka et al.

(10) Patent No.: US 9,832,741 B1
(45) Date of Patent: Nov. 28, 2017

(54) DYNAMICALLY MODIFYING TRANSMIT POWER BASED ON REFERENCE SIGNAL RECEIVE POWER

(71) Applicant: Sprint Communications Company L.P., Overland Park, KS (US)

(72) Inventors: Chaitanya Chukka, Overland Park, KS (US); Ivy Yvonne Kelly, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/064,764

(22) Filed: Mar. 9, 2016

(51) Int. Cl.
*H04W 52/24* (2009.01)
*H04W 52/32* (2009.01)

(52) U.S. Cl.
CPC .................................. *H04W 52/32* (2013.01)

(58) Field of Classification Search
None
See application file for complete search history.

(56) References Cited

U.S. PATENT DOCUMENTS

| | | | |
|---|---|---|---|
| 5,960,351 A | 9/1999 | Przelomiec | |
| 2015/0023309 A1* | 1/2015 | Wu | H04W 52/244 370/329 |
| 2015/0223135 A1* | 8/2015 | Ratasuk | H04W 16/32 455/436 |
| 2016/0205695 A1* | 7/2016 | Kishiyama | H04W 52/243 370/315 |

* cited by examiner

*Primary Examiner* — Wesley Kim
*Assistant Examiner* — Dong-Chang Shiue

(57) ABSTRACT

The technology disclosed herein enhances the operation of a wireless access node to dynamically provide transmit power based on Reference Signal Receive Power (RSRP). In one implementation, a method of operating a wireless access node includes transmitting first signals with wireless communication devices using a first transmit power, and identifying RSRP values for the wireless communication devices. The method further includes identifying distances between the wireless access node and each wireless communication device, normalizing the RSRP values based on the distances, identifying a target RSRP based on the normalized RSRP values, and determining a second transmit power based on the target RSRP. The method further provides transmitting second signals to the wireless communication devices using the second transmit power.

6 Claims, 7 Drawing Sheets

DYNAMICALLY MODIFYING TRANSMIT POWER BASED ON REFERENCE SIGNAL RECEIVE POWER

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some wireless networks, the frequency band allocated to a particular wireless service provider may operate adjacent to one or more frequency bands for other service providers or networks. Consequently, based on the amount of power being transmitted by the individual service provider at the wireless access nodes, noise may be generated in the adjacent frequency bands. This noise may limit the adjacent frequency bands from adequately supplying service to connected devices, such as smartphones, tablets, laptop computers, gaming systems, and the like. To remedy the interference and noise generated from a first frequency band on other frequency bands, power may be limited in the transmission of signals from the access nodes associated with the first frequency band. However, although limiting the transmission power for wireless access nodes of a first frequency band may minimize the amount of noise and interference in other frequency bands, it is difficult to balance or dynamically modify the transmit power based on the requirements of devices communicatively coupled to the first frequency band.

Overview

The technology disclosed herein enhances the ability of a wireless service provider to dynamically modify transmit power based on Reference Signal Receive Power (RSRP) values for wireless communication devices. In one implementation, a method of operating a wireless access node to serve wireless communication devices includes transmitting first wireless signals to the wireless communication devices using a first transmit power. The method further provides identifying distances between the wireless access node and individual ones of the wireless communication devices, and identifying RSRP values for the individual wireless communication devices. The method also includes normalizing the RSRP values based on the distances for the individual wireless communication devices, identifying a target RSRP based on the normalized RSRP values, and determining a second transmit power based on the target RSRP. The method further provides transmitting second wireless signals to the wireless communication devices using the second transmit power to deliver the target RSRP at the wireless communication devices.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
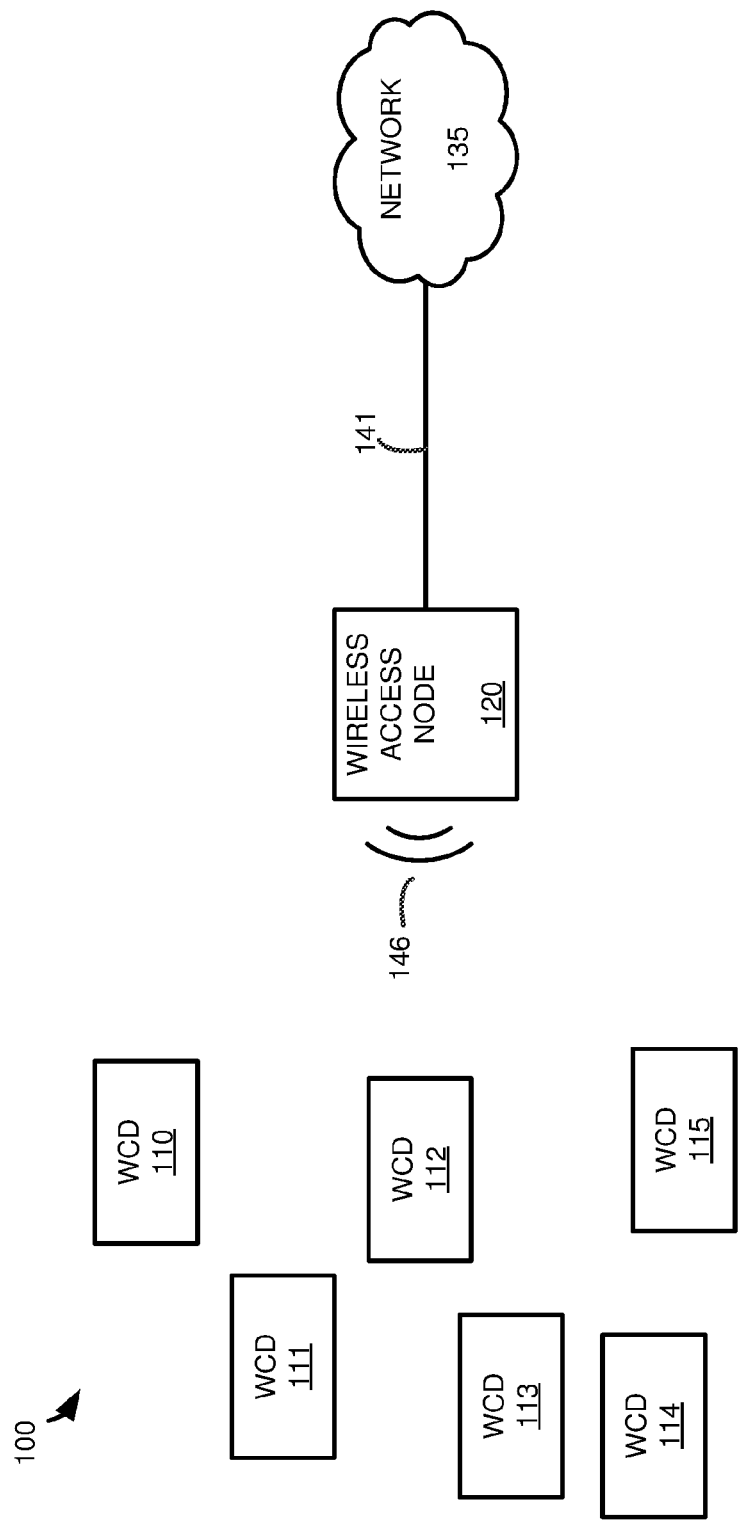
FIG. 1 illustrates a communication system to dynamically modify transmit power based on reference signal receive power.

FIG. 1 illustrates a communication system 100 to dynamically modify transmit power based on reference signal receive power. Communication system 100 includes wireless communication devices 110-115, wireless access node 120, and network 135. Wireless access node 120 provides wireless signals 146 to WCDs 110-115 using a particular frequency band. Wireless access node 120 further communicates with network 135 via communication link 141. Network 135 may comprise gateways and routers for a wireless service provider network, and may further represent gateways and routers for the Internet or some other packet data network.

WCDs 110-115 each include applications and services that require a wireless connection to provide the desired operations of the user associated with the particular wireless device. These applications and services may include web browsing applications, email applications, gaming applications, file sharing applications, messaging and voice applications, or any other similar application or service. To provide the wireless communications, WCDs 110-115 will attach to wireless access node 120 using a variety of handshaking and approval processes, and initiate communications with other wireless devices, service providers, hosts, servers, or any other similar service or system via wireless access node 120 and/or network 135.

In the present implementation, wireless access node 120 is associated with a first frequency band that is provided to WCDs 110-115. This frequency band may span any range of frequencies allocated to a wireless service provider to deliver data services to the connecting devices. Further, the frequency band supplied by wireless access node 120 may be transmitted by the node at varying transmitting powers based on current network conditions for WCDs 110-115 that are communicating via the node. In some implementations, this varying transmitting power may be based on reference signal receive power (RSRP) values reported from WCDs 110-115, as well as distance information regarding the distance of WCDs 110-115 from wireless access node 120. Once the information is obtained for WCDs 110-115, wireless access node 120 may make a determination on whether a modification is required to the transmitting power, and implement a required modification if necessary.

Figure 2:
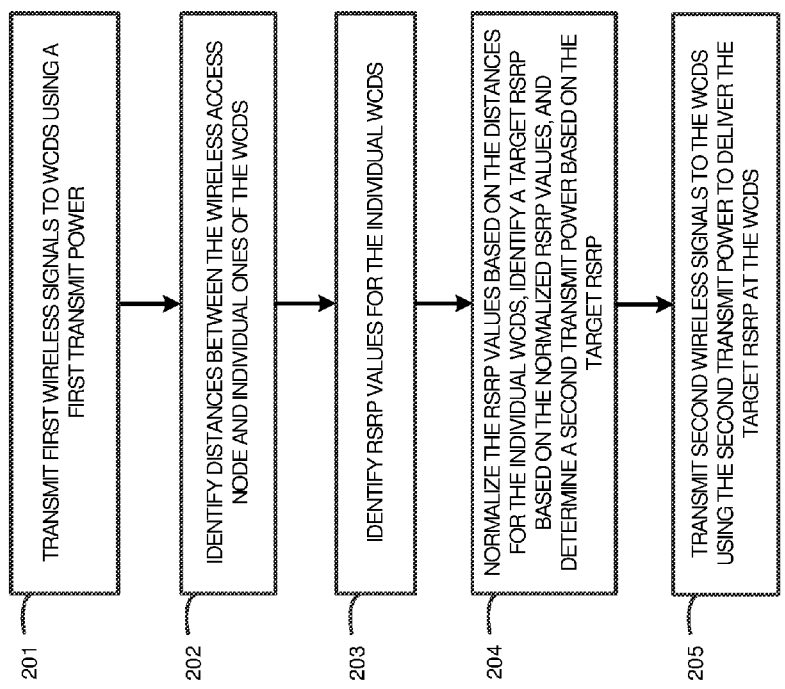
FIG. 2 illustrates a method of operating a wireless access node to dynamically modify transmit power based on reference signal receive power.

To further demonstrate the operations of wireless access node 120, FIG. 2 is provided. FIG. 2 illustrates a method of operating a wireless access node to dynamically modify transmit power based on reference signal receive power. The operations of FIG. 2 are referenced parenthetically in the paragraphs that follow, along with references to the elements and systems from communication system 100 of FIG. 1.

As described previously in claim 1, WCDs 110-115 may rely on and attach to wireless access node 120 to provide desired communication operations. While attached, LTE access node 120 transmits first wireless signals to WCDs 110-115 using a first transmit power (201). During the transmission using the first transmit power, wireless access node 120 identifies distances between wireless access node 120 and individual ones of WCDs 110-115 (202). In some implementations, to determine these distances, wireless access node 120 may rely on positioning information provided by each of the devices, such as global positioning satellite (GPS) information or any other similar location information. Once the location information is obtained from the individual devices, wireless access node 120 may determine the distance of each of the devices from the access node. Further, in addition to identifying the distances for the individual devices, wireless access node may identify RSRP values for each of the devices (203), wherein the RSRP values indicate a current power being received by the individual devices.

Once the distance information and the RSRP values are identified for connecting WCDs 110-115, wireless access node 120 normalizes the RSRP values based on the distances for the individual WCDs, identifies a target RSRP based on the normalized RSRP values, and determines a second transmit power based on the target RSRP (204). In some implementations, to normalize the RSRP values based on the distance, wireless access node 120 may apply a function to relate the individual RSRP value for a device to the distance of the same device. Consequently, a device that is close in proximity to the wireless access node would have a normalized value that can be compared to a device that is a much further distance from the same wireless access node. After the normalized values are determined for each of WCDs 110-114, wireless access node 120 may identify a target RSRP based on the normalized values. In some implementations, this identification of a target RSRP may include determining whether the normalized RSRP values meet transmit modification criteria, indicating a requirement that the access node increase or decrease the transmission power. In some implementations, the target RSRP may comprise a target increase or decrease in RSRP based on the normalized RSRP values. For example, the normalized RSRP values may be averaged and compared against a preferred average RSRP value for the same devices and identified distances to determine the target increase/decrease RSRP value for the devices. Once the target RSRP is determined, wireless access node 120 may increase or decrease the transmit power based on the target. Thus, if the target RSRP value indicated a decrease in RSRP for the wireless devices, then wireless access node 120 may decrease the transmit power that is provided to the devices. In contrast, if the target RSRP value indicated an increase in RSRP for the wireless devices, then wireless access node 120 may increase the transmit power that is provided to the devices.

After a determination is made regarding the increase or decrease in transmit power for wireless access node 120, wireless access node 120 may transmit second wireless signals to WCDs 110-115 using the second transmit power to deliver the target RSRP at the WCDs (205). Referring to the examples above, to increase the RSRP values for the devices, wireless access node 120 may increase the transmit power until the target RSRP is attained, whereas to decrease the RSRP values for the devices, wireless access node 120 may decrease the transmit power until the target RSRP is attained.

Although illustrated as using all of the devices in the example of FIG. 2 to determine the target RSRP value, it should be understood that any subset of the devices may be used to determine the modification to the RSRP value. For example, wireless access node 120 may select random devices attached to the node, and make a determination about the target RSRP based on the selection of devices. Using the example of communication system 100, wireless access node 120 may select WCDs 110-112 as a sample of the overall connecting devices. Once selected, wireless access node 120 may determine a target RSRP value based on the distances and the measured RSRP values for the devices, and modify the transmit power of the node based the determined target RSRP.

Further, despite being illustrated in the example of FIG. 2 as relying on the target RSRP to determine the second transmit power, it should be understood that other factors may also be used in modifying the transmission to WCDs 110-115. These other factors may include the antenna type for the wireless access node, the orientation and morphology of the wireless access node, signal to interference plus noise ratio (SINR) values reported for the devices, or any other similar characteristic of wireless access node 120, including combinations thereof. Accordingly, different access nodes may require different transmit power changes based on the physical characteristics of the access node. Similarly, although described in the example of FIG. 2 as modifying the transmit power to the device, it should be understood that the downtilt for the access node may be modified to adjust the RSRP for the device. For example, during the first communication signals the wireless access node may use a first downtilt configuration, and during the second communication signals, the wireless access node may use a second downtilt configuration.

Figure 3A:
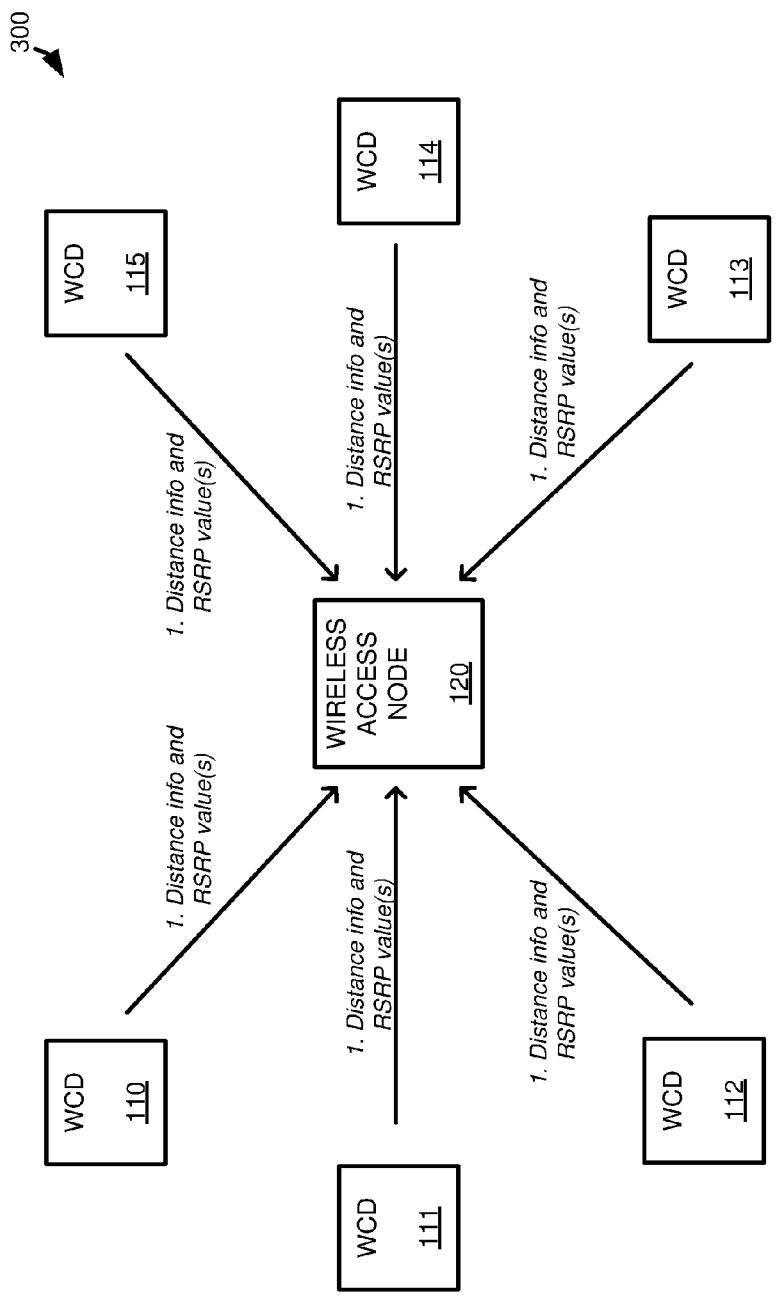
FIG. 3A illustrates an operational scenario of dynamically modifying transmit power to wireless communication devices based on reference signal receive power.
Figure 3B:
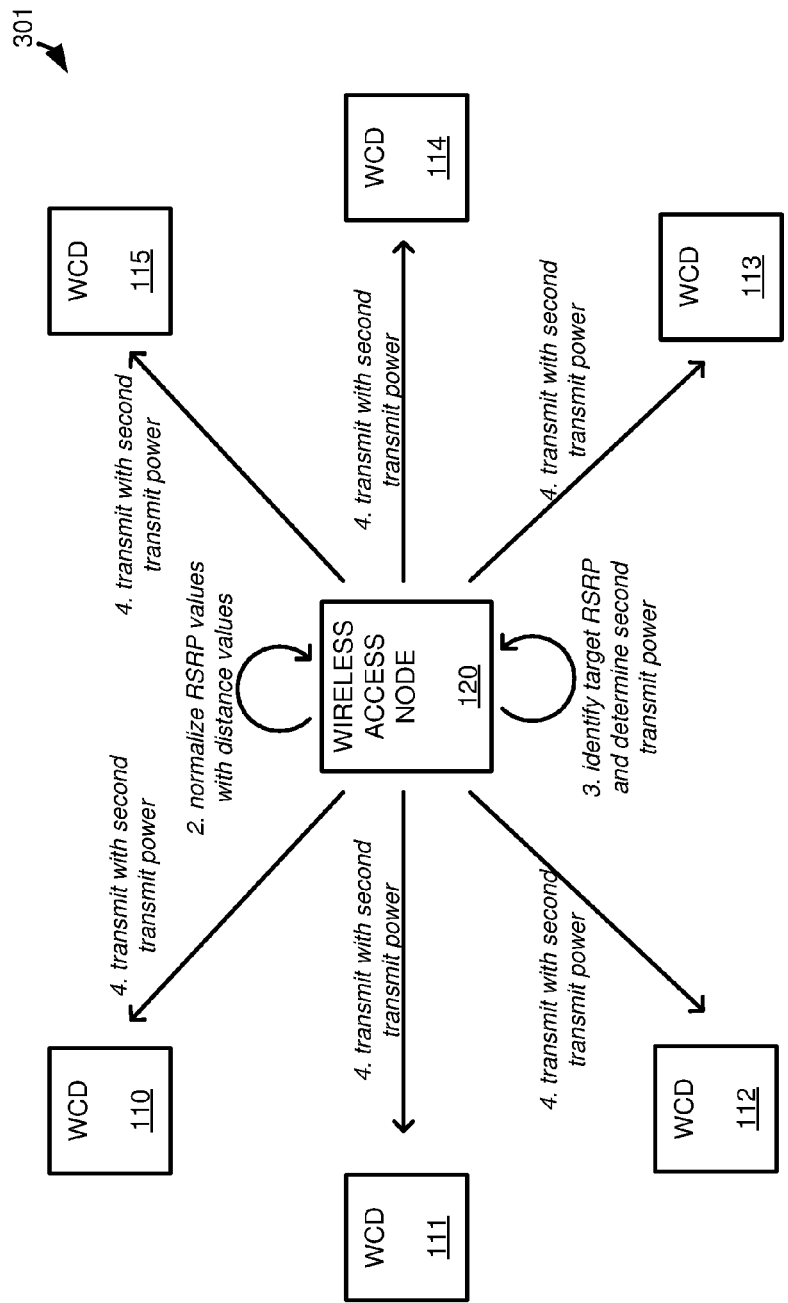
FIG. 3B illustrates an operational scenario of dynamically modifying transmit power to wireless communication devices based on reference signal receive power.

FIGS. 3A and 3B illustrate operational scenarios 300 and 301 of dynamically modifying transmit power to wireless communication devices based on reference signal receive power. FIGS. 3A and 3B include WCDs 110-115 and wireless access node 120 from communication system 100 of FIG. 1.

Referring first to FIG. 3A and operational scenario 300, wireless access node 120 provides wireless signaling to WCDs 110-115 using a first transmit power. During the communication with WCDs 110-115, wireless access node 120, at step 1, identifies distance information and RSRP values for each WCD in WCDs 110-115. Here, to identify the distance information and the RSRP values for WCDs 110-115, wireless access node 120 receives the information from the individual devices. In some implementations, the distance information may include global positioning information from the wireless devices, while the RSRP values are measured via processing and signaling systems on the WCDs. Once the global positioning information is received from WCDs 110-115, distances for the devices may be determined based on the position of wireless access node 120 in relation to the wireless devices.

Turning to FIG. 3B and operational scenario 301, which is an extension of the operations described in FIG. 3A, wireless access node 120, at step 2, normalizes the received RSRP values based on the distances determined for each of the wireless devices. In some implementations, to normalize the RSRP values received from the wireless devices, wireless access node 120 may apply a function that can be used to generate new RSRP values that can be directly compared to one another without consideration of the distances from the wireless access node. Thus, RSRP values that are measured at a further distance from the wireless access node will be comparable to the RSRP values that are measured at a closer distance to the wireless access node.

Once the normalized RSRP values are identified, wireless access node 120, at step 3, identifies a target RSRP value for WCDs 110-115 and determines a second transmit power for the devices. In some implementations, wireless access node 120 will identify an increase or decrease in RSRP for the wireless devices based on the normalized RSRP values. For example, wireless access node 120 may average the normalized RSRP values and determine an increase or decrease in RSRP based on a preferred RSRP value for connecting wireless devices. In some examples, before determining a second transmit power for wireless access node 120, the process of identifying the target RSRP value may include identifying whether the normalized RSRP values meet a transmit modification criteria. If the normalized RSRP values fail to meet the criteria, then wireless access node 120 may continue the transmission of signals using the first transmit power. However, if the normalized RSRP values do meet the transmit modification criteria, wireless access node 120 may identify a target RSRP value to provide the appropriate service to the end user devices. For example, in response to the normalized RSRP values meeting the criteria, indicating the devices are receiving more transmit power than required, wireless access node 120 may decrease the power provided to the devices.

As depicted in FIG. 3B, once a target RSRP is determined, wireless access node 120 determines a second transmit power and transmits, at step 4, signals to WCDs 110-115 using the second transmit power. In some implementations, in determining the second transmit power, wireless access node 120 may gradually increase or decrease the transmission power to the devices, until the target RSRP value is attained for the devices.

Figure 4:
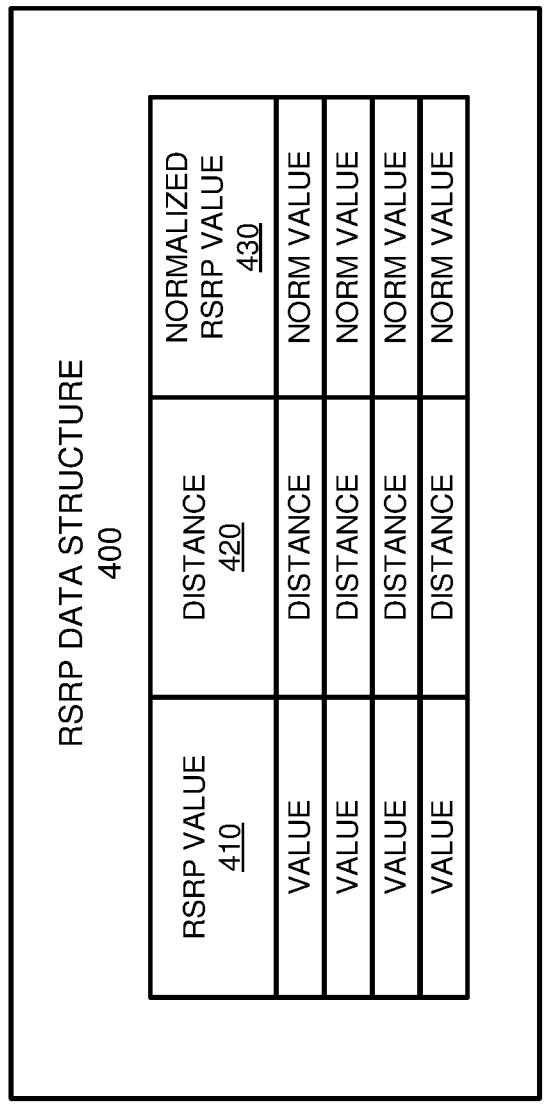
FIG. 4 illustrates a reference signal receive power data structure to determine normalized reference signal receive power values based on measured reference signal receive power values and distances for wireless communication devices.

FIG. 4 illustrates a RSRP data structure 400 to determine normalized RSRP values based on measured RSRP values and distances for wireless communication devices. Data structure 400 includes RSRP value columns 410, distance column 420, and normalized RSRP value 430. Although illustrated as a table in the example of FIG. 4, it should be understood that data structure on a wireless access node may use a tree, linked list, array, or any other similar data structure or structures to determine the normalized RSRP value associated with a device.

As described herein, wireless access nodes, such as wireless access node 120, transmit signals to wireless devices, permitting the devices to communicate over the wireless network. During the communication of the signals using a first transmit power, the wireless devices transfer status information to the wireless access node, indicating a current RSRP value for the device and location information for the device. Based on the information, the wireless access node may modify the transmit power to increase or decrease the RSRP provided to the connecting devices.

In one example, the wireless access node may, in response to receiving the status information from a wireless device, calculate a normalized RSRP value for the device. In particular, distance may be determined based on the geographical position of the wireless device in reference to the wireless access node, may be determined based on the elapsed time for signaling between the wireless access node and the device, or may be based on any other similar manner. Once distance is determined, the wireless access node may apply the RSRP value in RSRP value column 410 and the distance value in distance column 420 to determine the normalized RSRP value from normalized RSRP value column 430. This normalized value may then be used in combination with other RSRP values for the other communicating devices to determine the target RSRP as described herein.

In some implementations, the normalized RSRP values and a preferred RSRP value may be used to determine a target value that comprises the difference between the normalized RSRP values and the preferred RSRP value. For example, an average may be determined for the normalized values and compared with the target value to determine the increase or decrease target value for RSRP to the devices. In some implementations, in determining the target RSRP value based on the normalized RSRP values, the wireless access node may determine if the normalized RSRP values for the devices meet transmit modification criteria and, if they meet the criteria, the wireless access node may determine a new target RSRP value for the communication signals. For example, if the measured RSRP for the devices were higher than necessary to provide the required communications, the RSRP values may meet transmit modification criteria indicating that the transmit power can be reduced. Once met, a new target RSRP value may be determined for the devices, wherein the new target RSRP may indicate a reduction in RSRP for the devices.

Figure 5:
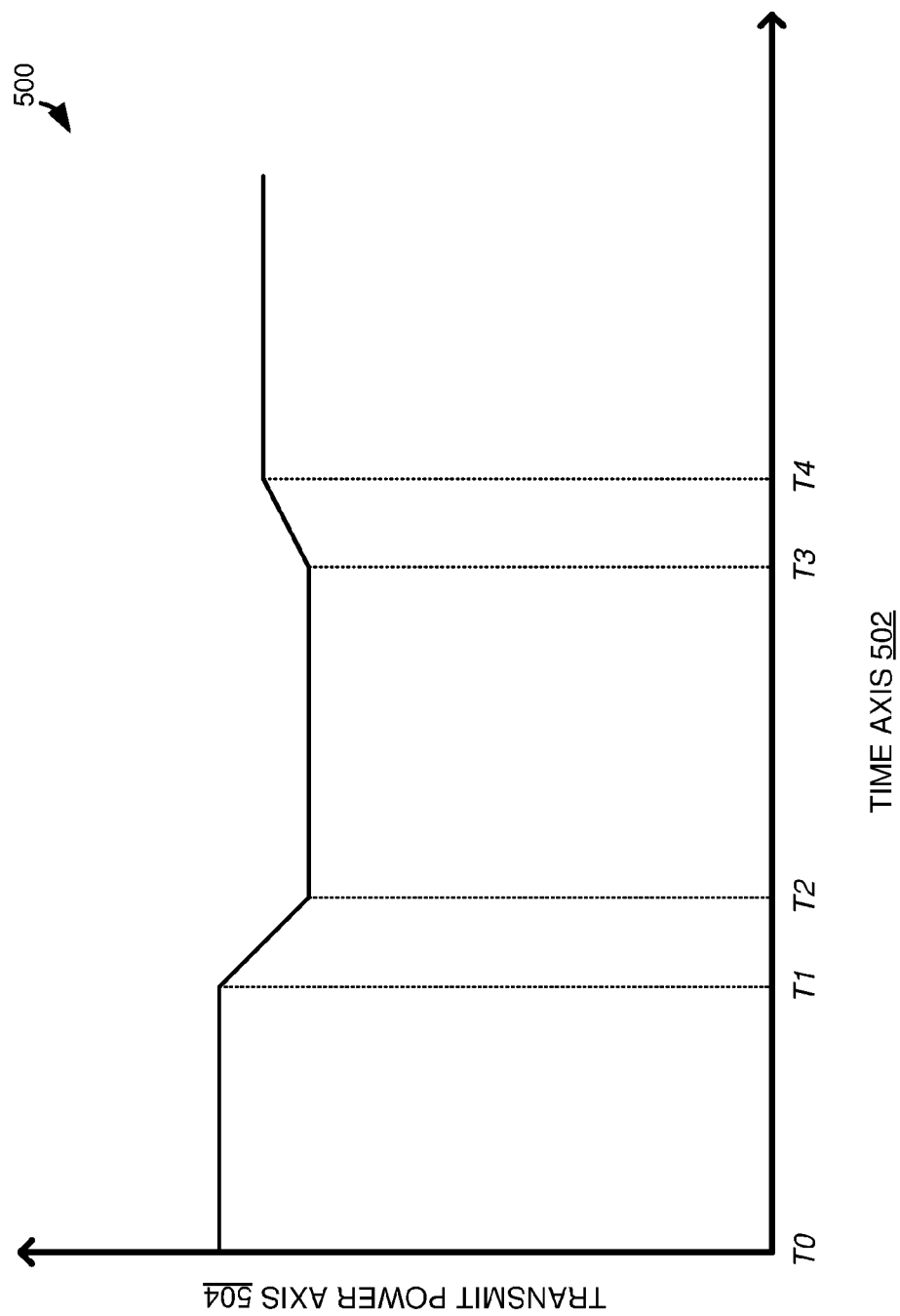
FIG. 5 illustrates a visual representation of transmit power of a wireless access node of a period time.

FIG. 5 illustrates a visual representation 500 of transmit power of a wireless access node of a period time. Visual representation 500 graphically represents transmit power over time for a wireless access node. Visual representation 500 includes time axis 502 and transmit power axis 504.

As illustrated, at time T0, the wireless access node transmits data to connecting wireless devices using a first transmit power. During the communication of the first signals, the wireless access node monitors RSRP values and distance information for the devices, and modifies the transmit power based on RSRP values and the distance information. Here, at time T1, the LTE access node identifies that the current transmit power is improper for connecting devices, and lowers the power until time T2.

In determining the amount to lower the transmission power, the wireless access node may normalize the RSRP values from the wireless devices based on the distances the devices are from the access node. Once the values are normalized, the wireless access node may identify a target RSRP value for the device based on the normalized values, and modify the transmit power based on the target RSRP value. In the example of FIG. 5, the wireless access node determines at time T1 that the transmit power should be lowered to accommodate the target RSRP for the connecting devices. Consequently, by time T2, the wireless access node has lowered the transmit power to a sufficient level to support the target RSRP value for the devices. This lower RSRP value may permit the wireless access node to limit the amount of noise caused in other frequency bands based on distortion or other similar factors.

After the wireless access node lowers the transmission power provided to the devices, the wireless access node again identifies a required transition to a higher transmit power at time T3. This increase in power may result when the devices connected to the wireless access node require a higher RSRP than was provided prior to time T3. As a result of the changed requirements for the wireless devices, by time T4, the transmit power for the wireless access node has increased to provide the devices with the target RSRP value.

In at least one implementation, the wireless access node may, based on the status information for the devices, determine whether the normalized RSRP values meet a transmit modification criteria. If the normalized RSRP values from the connected devices fail to meet the transmit modification criteria, then the wireless access node will continue to transmit using the current transmit power. In contrast, if the normalized RSRP values from the connected devices do meet the transmit modification criteria, then the wireless access node will increase or decrease the transmit power to accommodate a new target RSRP for the devices. For example, the wireless access node may determine that the normalized RSRP values for the devices are too high and meet a transmit modification criteria. Consequently, the wireless access node may identify a new target RSRP for the devices based on the devices receiving too high of normalized RSRP values, and lower the transmit power to meet the new target RSRP for the devices. Referring to FIG. 5, this may be the occurrence at times T1 and T2.

Although described in the example of FIG. 5 as relying on the target RSRP to determine the second transmit power, it should be understood that other factors may also be used in modifying the transmission to WCDs 110-115. These other factors may include the antenna type for the wireless access node, the orientation and morphology of the wireless access node, or any other similar characteristic of wireless access node 120, including combinations thereof. Accordingly, different access node configurations may require different transmit power changes based on the physical characteristics of the access node. For example, a first wireless access node with a first antenna type may require less of a transmit power modification than a second wireless access node.

Further, although described in the example of FIG. 5 as modifying the transmit power for the device, it should be understood that the downtilt for the access node may be modified to adjust the RSRP for the connected wireless devices. For example, during first communication signals the wireless access node may use a first downtilt configuration, and during the second communication signals, the wireless access node may use a second downtilt configuration to either increase or decrease the RSRP for the devices.

Figure 6:
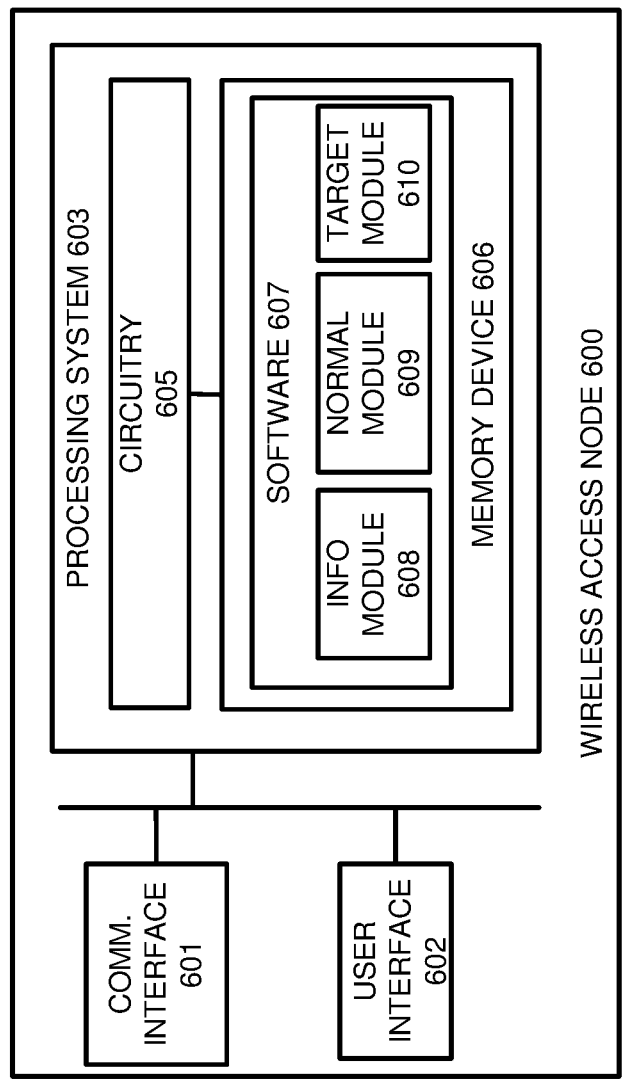
FIG. 6 illustrates a wireless access node to dynamically modify transmit power based on reference signal receive power.

FIG. 6 illustrates a wireless access node to modify headroom timers based on service types for wireless communication devices. Wireless access node 600 is representative of any computing system or systems with which the various operational architectures, processes, scenarios, and sequences disclosed herein for a wireless access node may be implemented. Wireless access node 600 is an example of wireless access node from FIG. 1, although other examples may exist. Wireless access node 600 comprises communication interface 601, user interface 602, and processing system 603. Processing system 603 is linked to communication interface 601 and user interface 602. Processing system 603 includes processing circuitry 605 and memory device 606 that stores operating software 607. Wireless access node 600 may include other well-known components such as a battery and enclosure that are not shown for clarity.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 may be configured to communicate with one or more routers and gateways of a service provider network, and further configured to wirelessly communicate with a plurality of WCDs.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes information (info) module 608, normal module 609, and target module 610, although any number of software modules may provide the same operation. Operating software 607 may further include an operating system, utilities, drivers, network interfaces, applications, or some other type of software. When executed by processing circuitry 605, operating software 607 directs processing system 603 to operate wireless access node 600 as described herein.

In at least one implementation, information module 608 directs processing system 603 to transmit first signals to a set of WCDs using a first transmit power, and identify communication information for connected WCDs, wherein the communication information includes RSRP values associated with each of the devices and distance information for each of the devices. The devices may report the connection information periodically, upon request of wireless access node 600, or at any other interval. In some examples, to identify the distance information for the connecting devices, the devices may provide global positioning information to the wireless access node and, based on the global positioning information, the wireless access node may determine a distance of the device from the node. However, it should be understood that other distance methods may be used in determining the distance for each of the WCDs, including ping time or any other distance measurement information.

As the RSRP values and the distance information is collected for each of the devices, normal module 609 directs processing system 603 to normalize the RSRP values based on the distance. This normalization may be determined based on a function, based on a data structure, or based on any other similar process that can normalize the received RSRP values based on the distance of the devices from the wireless access node. In particular, the normalization process defines new RSRP values for the devices to make the values independent of the distance from the wireless access node. Consequently, a normalized RSRP value for a device that is close to the wireless access node may be directly compared to a normalized value for a device that is further away from the wireless access node.

Once the normalized values are determined for the connecting devices, target module 610 directs processing system 603 to identify a target RSRP value for the devices based on the normalized RSRP values. This target RSRP value may indicate an increase in the RSRP provided to the devices or may indicate a decrease in the RSRP provided to the devices based on the normalized values. For example, if the normalized RSRP values for the devices are lower, on average or by a majority, than a preferred RSRP value for the devices, then the target RSRP may indicate an increase in the overall RSRP for the devices.

In some implementations, wireless access node 600 may determine whether the normalized RSRP values for the devices meet transmit modification criteria. If the normalized values meet the modification criteria, target module 610 may direct processing system 603 to identify a target RSRP for the devices. For example, if the average normalized RSRP value were too low based on predefined criteria, then wireless access node 600 may identify a target RSRP to increase the average normalized RSRP for the connecting devices. This target RSRP may comprise a target normalized RSRP on average for the wireless devices, may comprise a target increase in normalized RSRP for the wireless devices, may comprise a target decrease in normalized RSRP for the wireless devices, or any other similar target RSRP value in relation to the normalized RSRP values.

Based on the target RSRP value, target module 610 further directs processing system 603 to determine a second transmit power based on the target RSRP value and transmit second signals to the WCDs using the second transmit power. For example, if the target RSRP value indicated a decrease in RSRP for the wireless devices, target module 610 may decrease the transmit power until the target RSRP value is attained. In contrast, if the target RSRP value indicated an increase in RSRP for the wireless devices, target module 610 may increase the transmit power until the target RSRP value is attained.

In some implementations, it should be understood that other factors may also be used in modifying the transmission power to the WCDs. These other factors may include the antenna type for the wireless access node, the orientation and morphology of the wireless access node, or any other similar characteristic of wireless access node 120, including combinations thereof. Accordingly, different access node configurations may require different transmit power changes based on the physical characteristics of the access node. For example, a first wireless access node with a first antenna type may require less of a transmit power modification than a second wireless access node.

Further, although described in the example of FIG. 6 as modifying the transmit power for the device, it should be understood that the downtilt for the access node may be modified to adjust the RSRP for the connected wireless devices. For example, during first communication signals the wireless access node may use a first downtilt configuration, and during the second communication signals, the wireless access node may use a second downtilt configuration to either increase or decrease the RSRP for the devices.

Returning to the elements of FIG. 1, WCDs 110-115 may each comprise Radio Frequency (RF) communication circuitry and an antenna. The RF communication circuitry typically includes an amplifier, filter, RF modulator, and signal processing circuitry. WCDs 110-115 may each include a user interface, memory device, software, processing circuitry, or some other communication components. WCDs 110-115 may each comprise a telephone, computer, e-book, mobile Internet appliance, wireless network interface card, media player, game console, or some other wireless communication apparatus.

Wireless access node 120 may comprise radio frequency (RF) communication circuitry and at least one antenna to provide wireless communication services to WCDs 110-115. The RF communication circuitry typically includes an amplifier, filter, RF modulator, and signal processing circuitry. Wireless access node 120 may comprise a router, server, memory device, software, processing circuitry, cabling, power supply, network communication interface, structural support, or some other communication apparatus. Wireless access node 120 may comprise a Long Term Evolution (LTE) access node (an eNodeB) in at least one example, but may comprise a Code Division Multiple Access (CDMA) node, a Global System for Mobile Communications (GSM) node, or some other wireless access node.

Network 135 may comprise the wireless service provider network, the Internet, IMS, or some other network that provides data services to WCDs 110-115. Communication network 135 may comprise switches, wireless access nodes, Internet routers, network gateways, application servers, computer systems, communication links, or some other type of communication equipment—including combinations thereof.

Wireless signaling 146 uses wireless links that use the air or space as transport media for the wireless communication format. Wireless signaling 146 may use various protocols, such as Code Division Multiple Access (CDMA), either Evolution-Data Optimized (EVDO) or single-carrier radio transmission technology link (1×RTT), Worldwide Interoperability for Microwave Access (WiMAX), Global System for Mobile Communication (GSM), Universal Mobile Telecommunications System (UMTS), Long Term Evolution (LTE), Wi-Fi, High Speed Packet Access (HSPA,), or some other wireless communication format. Communication link 141 uses metal, glass, air, space, or some other material as the transport media. Communication link 141 could use various communication protocols, such as Time Division Multiplex (TDM), Internet Protocol (IP), Ethernet, communication signaling, wireless communication signaling, or some other communication format—including combinations thereof. Communication link 141 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a wireless access node to serve wireless communication devices, the method comprising:
   transmitting first wireless signals to the wireless communication devices using a first transmit power;
   identifying distances between the wireless access node and individual ones of the wireless communication devices;
   identifying Reference Signal Receive Power (RSRP) values for the individual wireless communication devices;

normalizing the RSRP values based on the distances for the individual wireless communication devices, wherein the normalized RSRP values are averaged and compared against a preferred average RSRP value for the same devices and identified distances;

identifying a target RSRP based on the averaged normalized RSRP values compared against the preferred average RSRP value, and determining a second transmit power based on the target RSRP; and transmitting second wireless signals to the wireless communication devices using the second transmit power to deliver the target RSRP at the wireless communication devices.

2. The method of claim 1 wherein the wireless access node comprises a Long Term Evolution (LTE) access node.

3. The method of claim 1 further comprising identifying signal to interference plus noise ratio (SINR) values for the wireless communication devices, and wherein determining the second transmit power based on the target RSRP comprises determining the second transmit power based on the target RSRP and the SINR values for the wireless communication devices.

4. The apparatus of claim 1 wherein the processing instructions further direct the processing system to identify signal to interference plus noise ratio (SINR) values for the wireless communication devices, and wherein the processing instructions to determine the second transmit power based on the target RSRP direct the processing system to determine the second transmit power based on the target RSRP and the SINR values for the wireless communication devices.

5. An apparatus to dynamically modify transmit power to wireless communication devices, the apparatus comprising:

at least one non-transitory computer readable media;

processing instructions stored on the at least one non-transitory computer readable media that, when executed by a processing system, direct the processing system to:

transmit first wireless signals to the wireless communication devices using a first transmit power;

identify distances between the wireless access node and individual ones of the wireless communication devices;

identify Reference Signal Receive Power (RSRP) values for the individual wireless communication devices;

normalize the RSRP values based on the distances for the individual wireless communication devices, wherein the normalized RSRP values are averaged and compared against a preferred average RSRP value for the same devices and identified distances;

identify a target RSRP based on the averaged normalized RSRP values compared against the preferred average RSRP value, and determine a second transmit power based on the target RSRP; and transmit second wireless signals to the wireless communication devices using the second transmit power to deliver the target RSRP at the wireless communication devices.

6. The apparatus of claim 5 wherein the wireless access node comprises a Long Term Evolution (LTE) access node.

\* \* \* \* \*